US010095461B2

(12) United States Patent
Pohl

(10) Patent No.: US 10,095,461 B2
(45) Date of Patent: Oct. 9, 2018

(54) OUTSIDE-FACING DISPLAY FOR HEAD-MOUNTED DISPLAYS

(71) Applicant: Intel IP Corporation, Santa Clara, CA (US)

(72) Inventor: Daniel Pohl, Saarbrücken (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/274,416

(22) Filed: Sep. 23, 2016

(65) Prior Publication Data

US 2018/0088890 A1    Mar. 29, 2018

(51) Int. Cl.
*G09G 5/00* (2006.01)
*G06F 3/14* (2006.01)
*G06T 19/00* (2011.01)
*G06F 3/01* (2006.01)

(52) U.S. Cl.
CPC .......... *G06F 3/1454* (2013.01); *G06F 3/017* (2013.01); *G06T 19/006* (2013.01)

(58) Field of Classification Search
CPC ...... G06F 3/017; G06F 3/1423; G06F 3/1454; G06T 19/006; G02B 27/01; G02B 27/017; G02B 2027/0105; G02B 2027/0134; G02B 2027/0174; G02B 2027/0187
See application file for complete search history.

(56) References Cited

U.S. PATENT DOCUMENTS

| 8,964,298 | B2* | 2/2015 | Haddick | G06F 3/013 359/630 |
| 9,153,195 | B2* | 10/2015 | Geisner | G09G 5/00 |
| 9,529,200 | B2* | 12/2016 | Thurber | G02B 27/64 |
| 9,839,166 | B2* | 12/2017 | Kim | H05K 7/20972 |
| 2009/0219224 | A1* | 9/2009 | Elg | G06F 3/012 345/8 |
| 2010/0079356 | A1* | 4/2010 | Hoellwarth | G02B 27/017 345/8 |
| 2010/0164990 | A1* | 7/2010 | Van Doorn | G02B 27/017 345/633 |
| 2010/0277575 | A1* | 11/2010 | Ismael | G02B 27/2242 348/53 |
| 2013/0083003 | A1* | 4/2013 | Perez | G06F 3/005 345/419 |

(Continued)

OTHER PUBLICATIONS

Oculus VR, LLC., "Developer Introduction Guide, Display Setup", https://developer.oculus.com/documentation/pcsdk/0.6/concepts/dg-monitor-setup/[Aug. 8, 2016 1:21:52 PM].

(Continued)

*Primary Examiner* — Joe H Cheng
(74) *Attorney, Agent, or Firm* — Schwegman Lundberg & Woessner, P.A.

(57) ABSTRACT

Devices and methods disclosed herein may include a system for a multiple screen head-mounted display. The system includes a first transceiver to obtain a first perspective of a virtual environment. The first perspective may be used to render a first scene on a user facing display of a head-mounted display. The system further includes a calculator to transform the virtual environment from the first perspective to a second perspective. A second transceiver may provide the second perspective for use to render a second scene on an external facing display of the head-mounted display.

25 Claims, 8 Drawing Sheets

(56) References Cited

U.S. PATENT DOCUMENTS

| | | | | |
|---|---|---|---|---|
| 2015/0138645 A1* | 5/2015 | Yoo | G02B 27/0101 | 359/630 |
| 2015/0234192 A1* | 8/2015 | Lyons | G02B 27/0172 | 345/8 |
| 2015/0348327 A1* | 12/2015 | Zalewski | G06F 3/01 | 345/419 |
| 2016/0004085 A1* | 1/2016 | Stroetmann | G02B 27/017 | 345/8 |
| 2016/0011425 A1* | 1/2016 | Thurber | G02B 27/64 | 345/8 |
| 2016/0062125 A1* | 3/2016 | Baek | G02B 27/0176 | 361/679.01 |
| 2016/0224176 A1* | 8/2016 | Kim | G06F 3/0416 | |
| 2017/0090514 A1* | 3/2017 | Byun | G06F 1/166 | |
| 2017/0153672 A1* | 6/2017 | Shin | G06F 1/163 | |

OTHER PUBLICATIONS

Oculus VR, LLC., "PC SDK Developer Guide, Rendering to the Oculus Rift, Rendering Setup Outline", https://developer.oculus.com/documentation/pcsdk/latest/concepts/dg-render/[Aug. 8, 2016 1:46:54 PM].

Oculus VR, LLC., "PC Developer Guide, Initialization and Sensor Enumeration, Head Tracking and Sensors", https://developer.oculus.com/documentation/pcsdk/latest/concepts/dg-sensor/[Aug. 8, 2016 1:46:03 PM].

Oculus VR, LLC., "Mobile VR Application Development, User Interface Guidelines", https://developer.oculus.com/documentation/mobilesdk/latest/concepts/mobile-ui-guidelines-intro/[Aug. 8, 2016 1:51:32 PM].

* cited by examiner

OUTSIDE-FACING DISPLAY FOR HEAD-MOUNTED DISPLAYS

TECHNICAL FIELD

This document pertains generally, but not by way of limitation, to head-mounted displays, such as head-mounted displays adapted to communicate with external display devices.

BACKGROUND

Existing headsets, such as virtual reality (VR) headsets may include a screen for exclusive viewing by a user. For example, VR headsets are adapted for wearing on the head of a person with the screen positioned in front of the eyes of the person for an immersive visual experience. The VR headsets may be used for displaying graphics to a person wearing the VR headset. For instance, the graphics may provide a movie, television, virtual world, game, simulation, or the like. The VR headset may be in communication with a game console, computer, or mobile device for delivery of the graphics. In some examples, VR headsets may provide an enhanced user experience by presenting a wide-angle field of view for an immersive experience. VR headsets may be provided with graphics capable of panning and tilting along with the movement of the head of the person wearing the headset. In some instances, the VR headset may be used at home for entertainment, for work presentations, marketing demonstrations, in public for private viewing of the graphics, or other uses.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices and techniques for a system for a multiple screen head-mounted display, such as a system for presenting a first scene to a user facing display and presenting a second scene on the external facing display. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventor has recognized, among other things, that using a virtual reality head-mounted display may lead to isolation of the user and those around the user. For instance, isolation may occur because only the user experiences the virtual environment. Accordingly, in some instances there is a social stigma associated with using a head-mounted display in public.

The present subject matter provides a way for people around the user, referred to herein as observers, to share the virtual reality experience with the user. For instance, a system for a multiple screen head-mounted display may include a first transceiver to obtain a first perspective of a virtual environment. The first perspective may be used to render a first scene on a user facing display of a head-mounted display. A calculator may transform virtual environment from the first perspective to a second perspective. A second transceiver may provide the second perspective used to render a second scene on an external facing display of the head-mounted display. In an example the external facing display may be removably coupled to the head-mounted display. The first transceiver or the second transceiver may be communicatively coupled to the user facing display, external facing display, calculator, or other devices wirelessly. The second perspective may be controlled by an observer, for instance, through a mobile device or by gestures. In an example, the external facing display may present at least one fiducial marker that may be used by a position sensor to detect the relative position of the head-mounted display with respect to the position sensor. In various examples, the second perspective of the virtual environment may include a mirror image of the first perspective, an elevated viewpoint of the first scene, a stereoscopic scene, a monoscopic scene, a scoreboard, a tracking view, a third-person view, user or observer controllable view, or the like. In a further example, the system may include a plurality of external facing displays. For instance, a secondary external facing display may be positioned on the head-mounted display, such as on the back or side. In an example, the external facing display may be a three-dimensional wrap-wound display that may partially surround the head of the user.

Figure 1:
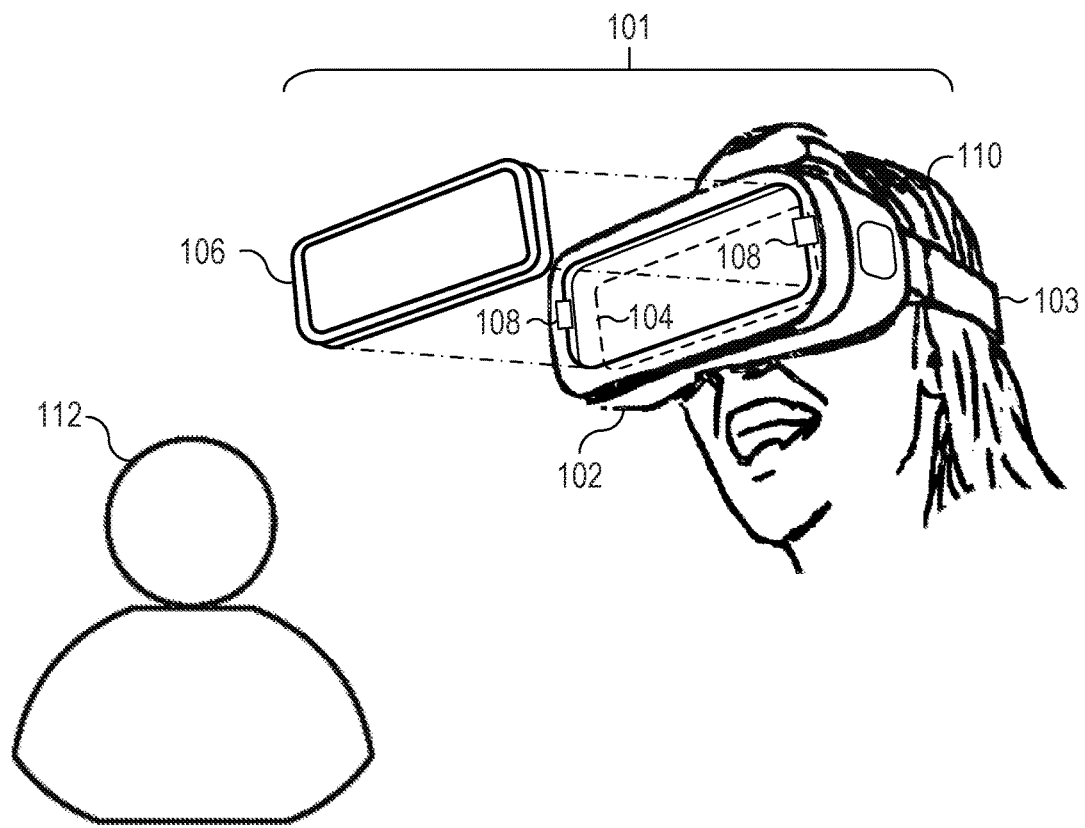
FIG. 1 illustrates an example of a multiple screen head-mounted display, according to an embodiment.

FIG. 1 illustrates an example of a multiple screen head-mounted display 101. In the example of FIG. 1, the head mounted display 101 may include a housing 102, at least one user facing display 104, and at least one external facing display 106. In an example, the housing 102 may include structure for supporting the user facing display 104. In an example, the user facing display 104 may be fixably attached to the housing 102. The housing 102 may be worn on the head of a user 110. For instance, the head-mounted display 101 may include a strap 103 attached to the housing 102 for securing the head-mounted display 101 to the head of the user 110. When the head-mounted display 101 is worn by the user 110, the user facing display 104 is positioned in the housing 102 for viewing by the user 110. Optionally, the external facing display 106 may be permanently or removably attached to the housing 102. For instance, the housing 102 may include at least one fastener 108 for attaching the external facing display 106 to the housing 102. The fastener 108 may include a latch, releasable coupling, clip, or other fastener. The housing 102 may include various configurations. In an example, the housing 102 may include, but is not limited to, a plastic molding adapted to attach to the user facing display 104 and the external facing display 106. In a further example, the housing 102 may be an integrated assembly including the user facing display 104 and the external facing display 106.

The user facing display 104 may include, but is not limited to a liquid crystal display (LCD), light emitting diode display (LED), plasma display, or projected image to present content, such as a first scene to the user 110. The user facing display 104 may be integrated into the head-mounted display 101 or may be an independent display, such as a mobile device including a display. In various examples, the user facing display 104 may include a monoscopic or stereoscopic display. For instance, where the user facing display 104 is stereoscopic, the user facing display 104 may present one image to each eye of the user, a left image and a right image. In a further example, a left user facing display may present the left image and a right user facing display may present the right image. The left image may include a slightly different perspective than the right image to provide a stereoscopic view to the user 110. The stereoscopic perspective may provide the user 110 with a perception of depth of objects within a virtual environment. One or more lenses may be attached to the housing 102 on a user facing side of the user facing display 104. The lenses may increase the field-of-view of the user facing display 104. For instance, the field-of-view may include, but is not limited to, 90°, 100°, 120°, or other field-of-view. In an example the lenses may increase the distance of focus from the eye of the user 110 to reduce eye strain. The first scene presented on the user facing display 104 may include distortion correction, such as barrel distortion correction to compensate for pincushion distortion that may be introduced by the lens.

The external facing display 106 may be attached to the head-mounted display 101. In various examples, the external facing display 106 may be attached to the housing 102 or the strap 103. The external facing display 106 may be positioned on the housing 102 facing outwardly (e.g., presentation side facing outwardly) from the housing 102 and away from the user 110 when worn. In operation, the external facing display 106 may present content, such as a second scene, to an observer 112. The observer 112 may be a person located near the user 110, such as someone in the same room of the user or in close proximity. In an example, the observer 112 may be a person sharing the virtual reality experience with the user 110, such as a friend, college, competitor, sales person, or other person. Accordingly, the observer 112 may participate in the virtual experience with the user 110 when the observer 112 is located within view of the external facing display 106. Accordingly, the external facing display 106 may reduce the isolation of the user 110 by sharing the user experience with one or more observers 112 located near the user 110. In an example, sharing the virtual environment with the observer 112 may increase social acceptance of wearing the head-mounted display 101 in public or around other people.

The external facing display 106 may include, but is not limited to a liquid crystal display (LCD), light emitting diode display (LED), plasma display, or projected image to present the second scene to the observer 112. The external facing display 106 may be integrated into the head-mounted display 101 or may be an independent display, such as a mobile device including a display. In an example, the external facing display 106 may include a monoscopic presentation of the first scene. For instance, the user facing display 104 may be present a stereoscopic presentation of the first scene and the external facing display 106 may present the second scene including one image of the stereoscopic presentation, such as the left eye image or the right eye image. In a further example, the external facing display 106 may include a stereoscopic presentation of the second scene. For instance, the external facing display 106 may present the same rendering presented by the user facing display 104.

As shown in the example of FIG. 1, the external facing display 106 may be removably attached (i.e., removably attachable) to the head-mounted display 101, such as removably attached to the housing 102, as previously described, or removably attached to the strap 103. For instance, the external facing display 106 may be removed from the head-mounted display 101 to reduce the weight and size of the head-mounted display 101 when the external facing display 106 is not in use. In a further example, the external facing display 106 may be detached from the head-mounted display 101 so the observer 112 may view the second scene presented on the external facing display 106 remotely from the head-mounted display 101. For instance, the observer 112 may detach the external facing display 106 from the head-mounted display 101 to hold the external facing display 106 for viewing. In an example, the external facing display 106 may include a touch-screen display. The observer 112 may control the second scene presented on the external facing display 106 by interacting with a user interface of the touch-screen display. For instance, the observer 112 may change the perspective of the scene presented on the external facing display 106 to a second perspective.

Figure 2:
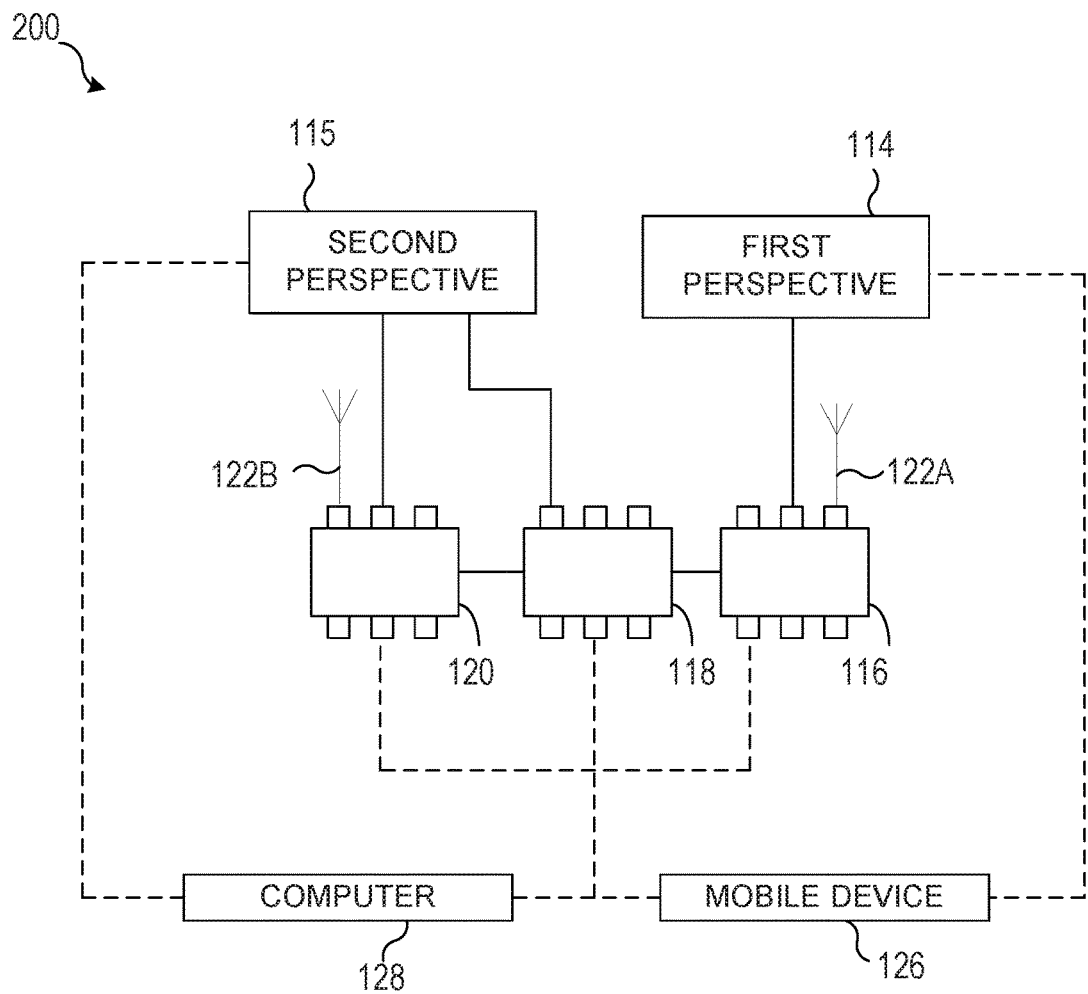
FIG. 2 depicts an example of a system for a multiple screen head-mounted display, according to an embodiment.

FIG. 2 depicts an example of a system 200 for a multiple screen head-mounted display 101. The system 200 includes a first transceiver 116, a calculator 118, and a second transceiver 120. In operation, the first transceiver 116 may obtain (e.g., receive or request and receive) a first perspective 114 of the first scene in the virtual environment as shown in FIG. 2 and described further herein. The first perspective 114 may include, but is not limited to, a virtual camera position, direction, vector (e.g., up-vector), or other information for use in communicating perspective data with respect to the virtual environment. The virtual environment may include a three-dimensional model. The first scene may be rendered based on the three-dimensional model and the first perspective 114. For instance, the first transceiver 116 may transmit the first perspective 114, and optionally the three-dimensional model, to a rendering pipeline to generate the first scene for presentation on the user facing display 104 or the external facing display 106.

The first scene may be generated by or communicated through a mobile device 126, a computer 128, the head-mounted display 101, or other device. The first transceiver 116 may include, but is not limited to, a bus, conductor, electrical connector, antenna 122A (such as a Wi-Fi, Bluetooth, cellular, or other antenna), chip, central processing unit (CPU), graphics processing unity (GPU), processor, application-specific integrated circuit (ASIC), field programmable gate array (FPGA), display driver, controller, mobile device, computer, or other transceiver. In an example, the first transceiver 116 may be integrated into the head-mounted display 101. For instance, the head-mounted display 101 may include the first transceiver 116 in an electronic circuit. In a further example, the first transceiver 116 may be independent of the head-mounted display 101.

For instance, the first transceiver 116 may be located in the external facing display 106, a mobile device 126, or a computer 128 that is wired or wirelessly communicatively coupled to the first transceiver 116. In various examples, the first transceiver 116 may receive or transmit one or more of the first perspective 114, the first scene, the three-dimensional model, or other information to one or more of the head-mounted display 101, the user facing display 104, the observer facing display 106, the calculator 118, the second transceiver 122, the mobile device 128, the computer 128, server, cloud server, or other device.

In the example of FIG. 2, the calculator 118 may obtain the first perspective 114 from the first transceiver 116 and perform a transform on the virtual environment to generate a second perspective 115 of the virtual environment. The virtual environment from the second perspective 115 may be for presentation of the second scene on the external facing display 106. For instance, the virtual environment from the first perspective 114 may be an input for the transform and the virtual environment from the second perspective 115 may be an output of the transform. In various examples, the transform may include, but is not limited to, a translation, rotation, reflection, scaling (e.g., resizing), dilation, or other transform. For instance, the second scene from the second perspective 115 may include an alternate view of the virtual environment. In an example, the transform may include no alteration of the first scene. In other words, the second scene may be the same as the first scene.

The calculator 118 may include, but is not limited to, a CPU, GPU, processor, ASIC, FPGA, display driver, controller, mobile device, computer, or other calculator. In an example, the calculator 116 may include a circuit or passive components. The calculator 118 may be integrated into the head-mounted display 101. In other examples, the calculator 118 may be located in the external facing display 106, mobile device 126, the computer 128, server, cloud server, or other device and may be wired or wirelessly communicatively coupled to the first transceiver 116 or the second transceiver 120.

The second transceiver 120 may provide the second perspective 115 of the virtual environment for rendering the second scene on the external facing display 106. For instance, the second transceiver 120 may obtain the second perspective 115 from the calculator 118 and transmit the second perspective 115, the second scene, or the three-dimensional model to the external facing display 106. In various examples, the second transceiver 120 may provide the second perspective 115 to a rendering pipeline, mobile device 126, computer 128, processor, or the like for use in presenting the virtual environment from second perspective 115 on the external facing display 106.

The second transceiver 120 may include, but is not limited to, a bus, conductor, electrical connector, antenna 122B (such as a Wi-Fi, Bluetooth, cellular, or other antenna), chip, CPU, GPU, processor, ASIC, FPGA, display driver, controller, mobile device 126, computer 128, or other transceiver. The second transceiver 120 may be located in the head-mounted display 101, external facing display 106, mobile device 126, computer 128, server, cloud server, or other device. The second transceiver 120 may be communicatively coupled to the external facing display 106, the calculator 118, the first transceiver 116, the mobile device 126, the computer 128, or other device by wire or wirelessly. In an example, the second transceiver 120 may transmit a wireless communication of the second perspective 115 from the antenna 122B to the external facing display 106 (e.g., a mobile device in the example of FIG. 1). The external facing display 106 may be configured to render the second scene based on the second perspective 115 and present the second scene to the observer 112.

Figure 3:
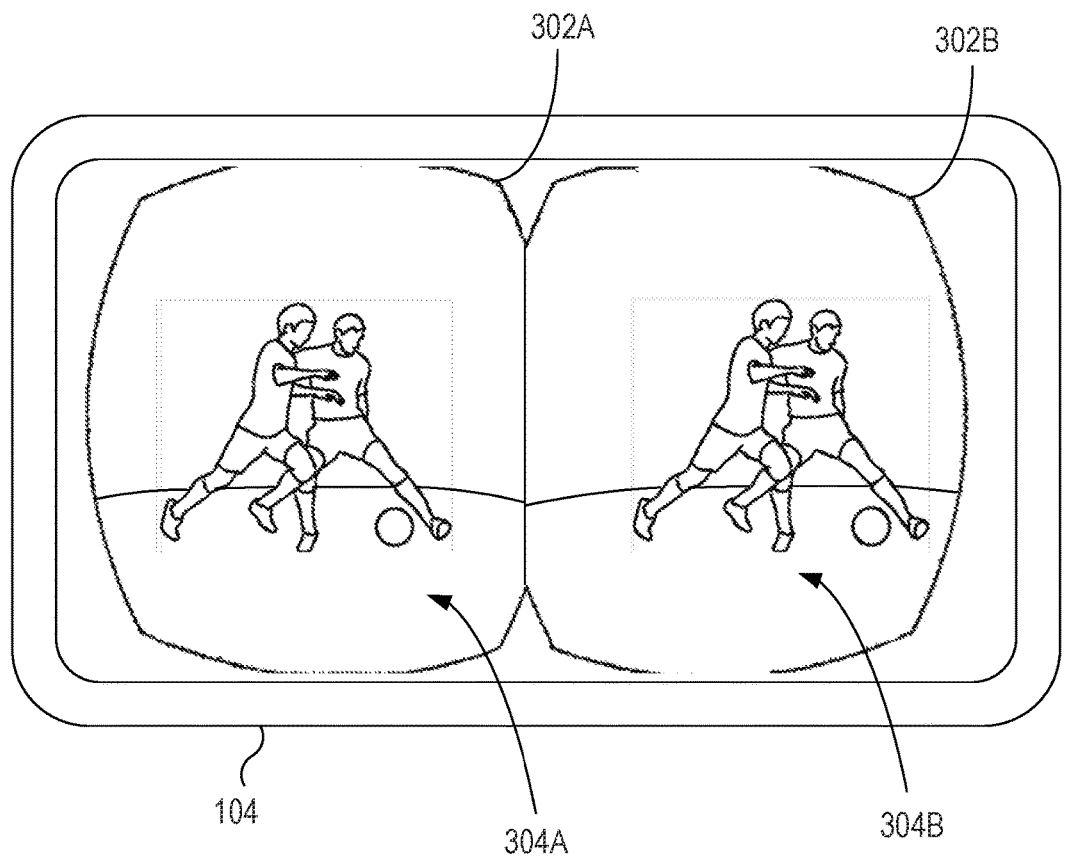
FIG. 3 depicts an example of a user facing display including a first scene from a first perspective, according to an embodiment.

FIG. 3 depicts an example of the user facing display 104 including a first scene, such as first scenes 304A-B, from a first perspective 114. For instance, the first perspective 114 may include a viewpoint of the virtual environment (e.g., three-dimensional model) to generate the first scene. As previously described, the first perspective 114 may include, but is not limited to, a virtual camera position, direction, up-vector, or other data for use in communicating perspective data with respect to a virtual environment. As shown in FIG. 3, the first perspective 114 is a first-person perspective of the virtual environment. The user facing display 104 illustrates a stereoscopic presentation of the first scene in the example of FIG. 3. For instance, the left image 302A may include a first scene 304A from a first perspective, and the right image 302B may include a first scene 304B from an offset first perspective. The stereoscopic presentation of the first scene may provide depth perception to the user 110.

Figure 4A:
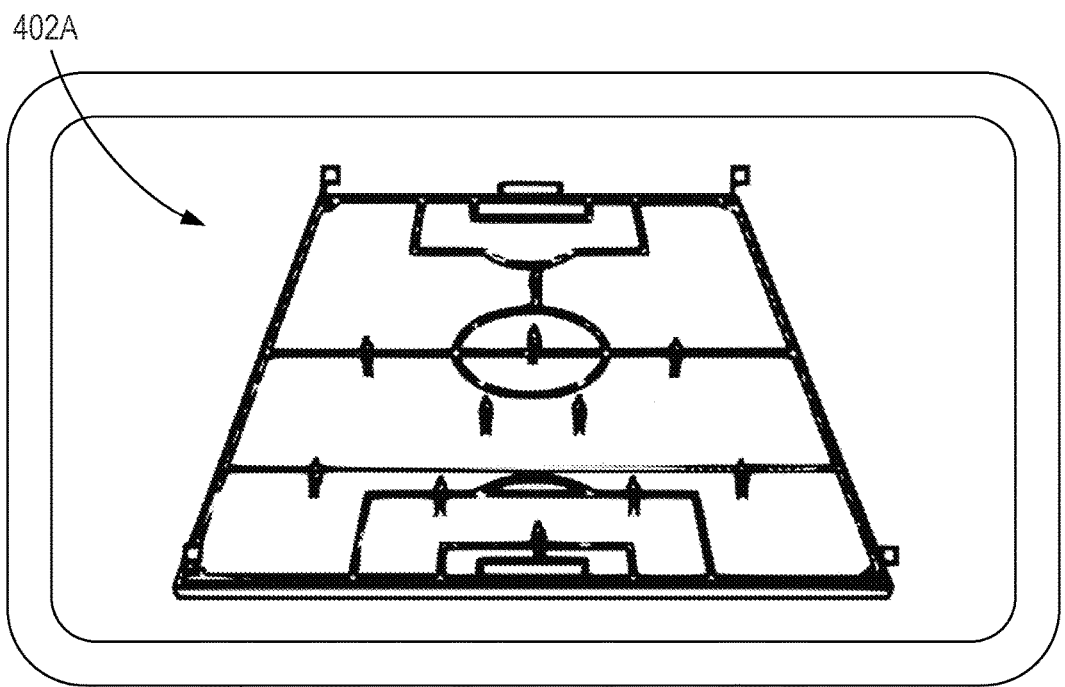
FIG. 4A depicts an example of an external facing display including a second scene from a second perspective, according to an embodiment.

FIG. 4A depicts an example of the external facing display 106 including the second scene, such as second scene 402A, from the second perspective 115. In the example of FIG. 4A the second perspective 115 may be an elevated view (e.g., birds-eye-view) of the second scene 402A. For instance, in the example of a virtual environment including a soccer game, the first perspective 114 may be a first person view or a following view of a soccer player. The second perspective 115 may be an elevated view of the soccer field as shown in the example of FIG. 4A.

Figure 4B:
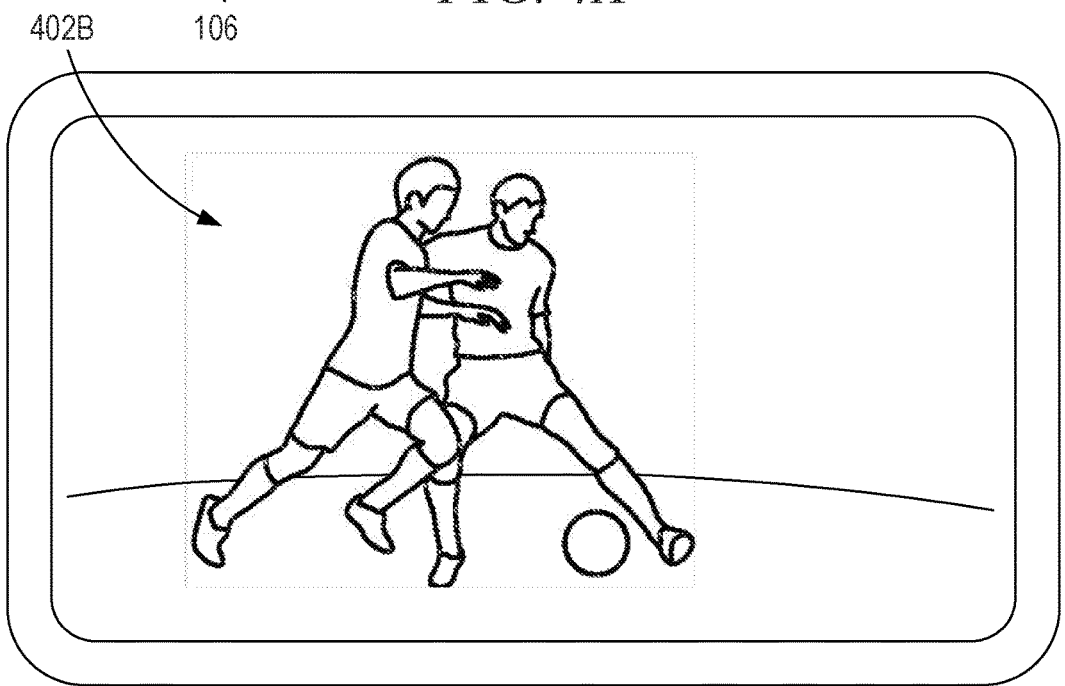
FIG. 4B depicts a further example of an external facing display including a second scene from a second perspective, according to an embodiment.

FIG. 4B depicts a further example of the external facing display 106 including a second scene 402B, from the second perspective 115. For instance, as shown in FIG. 4B, the second perspective 115 may be a first-person view of the second scene 402B. The presentation of the second scene 402B may be monoscopic, such as a monoscopic presentation of the first scene 304A or 304B as shown in FIG. 3 and described herein.

Figure 5:
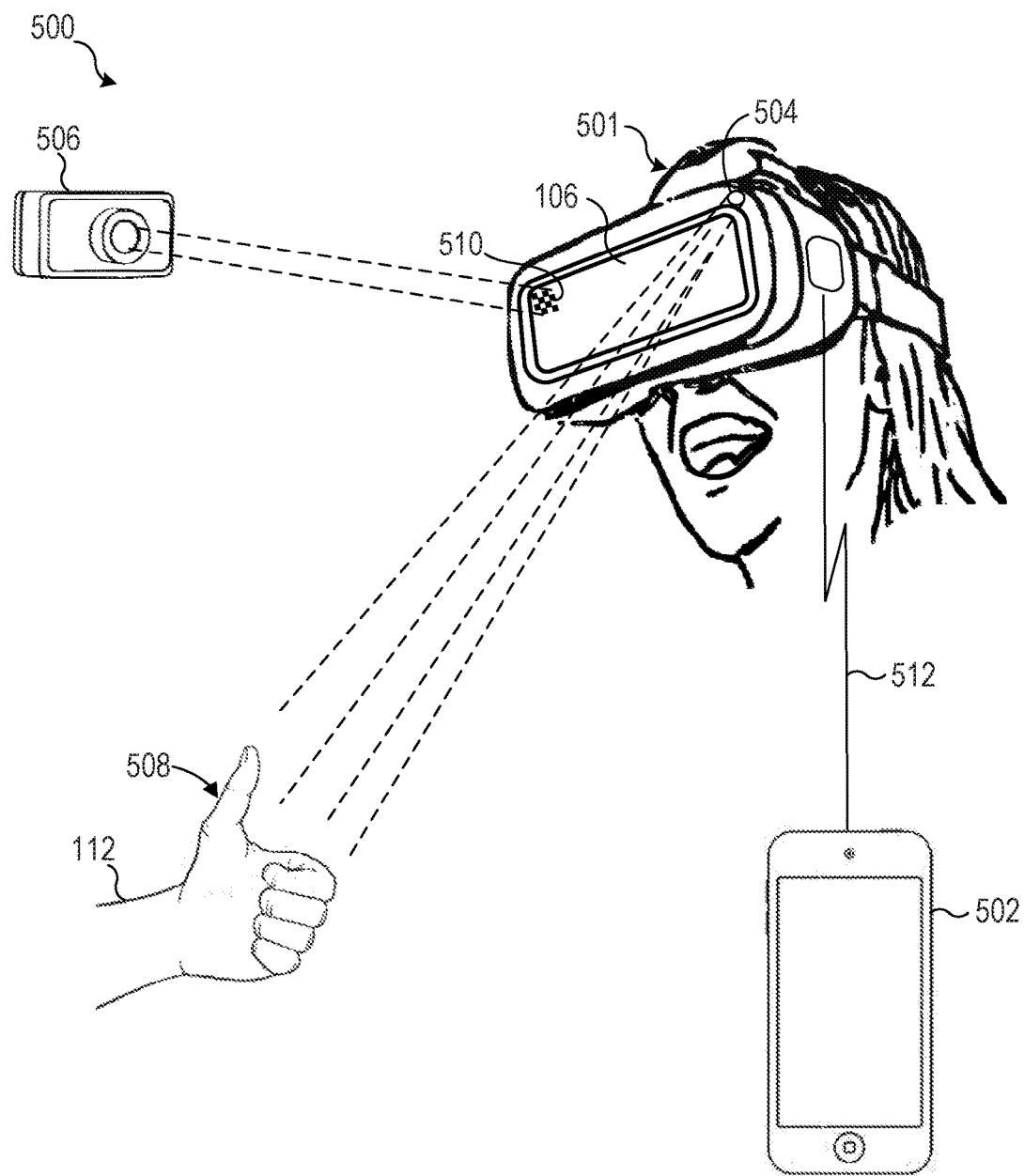
FIG. 5 illustrates an example of a system including at least one controller, according to an embodiment.

FIG. 5 illustrates an example of a system 500 including at least one controller for providing a message 512 to transform the virtual environment to a second perspective 115 to render the second scene on the external facing display 106. The various controllers may include, but are not limited to, a mobile device 502, a sensor 504 (e.g., a gesture sensor or a depth sensor), a position sensor 506, or the like. For instance, the mobile device 502 may provide the message 512 to the first transceiver 116, calculator 118, or second transceiver 120 to transform the virtual environment based on the second perspective 115. In an example, the mobile device 502 may provide a message 512 to transform the virtual environment to the second perspective 115 including the first-person view (e.g., second scene 402B) or the elevated view (e.g., second scene 402A). The mobile device 502 may include an application for communicating the message 512 to the first transceiver 116, calculator 118, or second transceiver 120.

In an example, the system 500 may optionally include a gesture sensor. For instance, the sensor 504 may be the gesture sensor. The sensor 504 may be attached to the head-mounted display 501 or the external facing display 106. In operation, the sensor 504 may detect a gesture 508 from a person, such as the observer 112. In response the gesture sensor may transmit a message including a parameter for the transform to the first transceiver 116, the calculator 118, or the second transceiver 120. The parameter may include information corresponding to a type of transformation. In an example, the parameter may correspond to a view, such as the first-person view, elevated view, scoreboard view, tracking view, or the like. In a further example, the parameter may include scaling, rotation, translation, or other transformation information to transform the virtual environment to the second perspective 115. The sensor 504 may detect gestures such as hand waiving, thumbs up, swiping, combinations thereof, or other gestures.

In an example, the sensor 504 may be a depth sensor. The depth sensor may detect distance between the sensor 504 and an object (e.g., the observer 112) within the field of view of the sensor 504. For instance, the depth sensor may transmit a signal. The depth sensor may then detect the signal returning to the depth sensor after reflecting off the object. The depth sensor may measure the duration of time for the signal to travel to the object and back and accordingly detect the distance to the object. The signal may be optical (such as laser light), sonic, or other type of signal. In an example, the depth sensor may include, but is not limited to one or more multiple color cameras or one or more infrared cameras operable to calculate or detect depth. In an example, the depth sensor may transmit a parameter, such as a depth field, to the first transceiver 116 or the calculator 118. The parameter may then be used for object detection, such as gesture recognition, for the transform.

As shown in the example of FIG. 5, the system 500 may include a position sensor 506. The position sensor 506 may provide a message including positional data to the calculator 118 for the transform. The position sensor 506 may detect a fiducial marker, such as fiducial marker 510 on the head-mounted display 501. In the example of FIG. 5, the fiducial marker 510 is presented on the external facing display 106. The fiducial marker 510 may include a checkerboard pattern or other mark for detection by the position sensor 506. For instance, the position sensor 506 may detect the relative position of the fiducial marker 510 based on the size of the fiducial marker 510 and the relative skew of the fiducial marker 510 with respect to the position sensor 506. The position sensor 506 may provide a message including the positional data, such as relative distance, pitch, yaw, and elevation to the calculator 118, the first transceiver 116, or second transceiver 120. Accordingly, the calculator 118 may receive positional data from the position sensor 506. In an example, the head-mounted display 501, calculator 118, user facing display 104, external facing display 106, or other device in the system 500 may include at least one gyroscope or accelerometer for determining the position of the head-mounted display 501. The positional data may be obtained by the calculator 118 from the gyroscope or the accelerometer.

Figure 6:
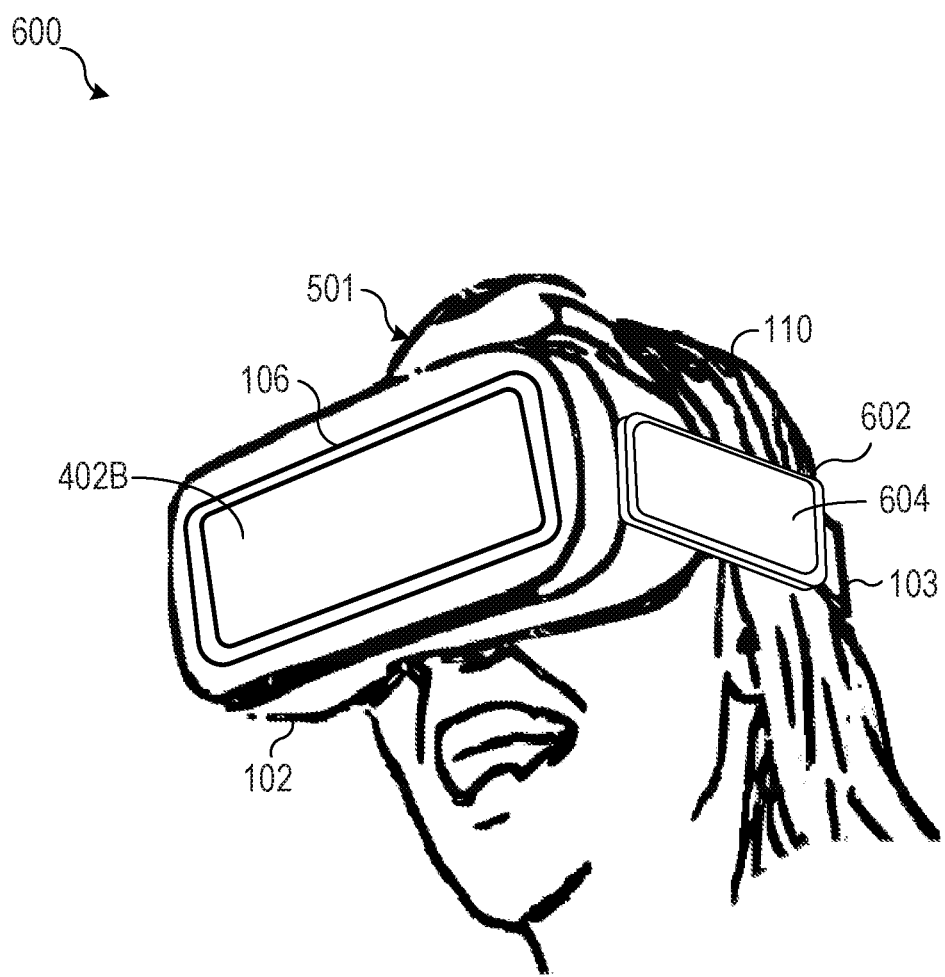
FIG. 6 depicts an example of a secondary external facing display, according to an embodiment.

FIG. 6 depicts an example of a secondary external facing display 602. For instance, a system 600 may include at least one secondary external facing display 602. The second transceiver 120 may provide the second perspective 115 (or third perspective) for presenting the first scene or the second scene, such as second scene 404A or 404B, on the secondary external facing display 602. In an example, the secondary external facing display 602 may present the same scene (e.g., second scene 402B as shown in FIG. 4B and described herein) as the external facing display 106. In a further example, the secondary external facing display 602 may present a third scene 604 from a third perspective that is different from the second perspective 115 used in the second scene 402B.

The secondary external facing display 602 may be attached to a head-mounted display, such as head-mounted display 101 or 501. The secondary external facing display 602 may be coupled to the back or one or more of the sides of the head-mounted display 501. For instance, as shown in the example of FIG. 6, the secondary external facing display 602 is attached to the strap 103. In an example, the secondary external facing display 602 may be attached to the housing 102. In an example, the external facing display 106 or the secondary external facing display 602 may include a wrap-around display. For instance, the head-mounted display (e.g., 101 or 501) may include a display that extends from a left side of the housing 102 to a right side of the housing 102. In a further example, the wrap-around display may extend three-hundred and sixty degrees around the head-mounted display 501. For instance, in operation, the wrap-around display may surround the head of the user 110.

Figure 7:
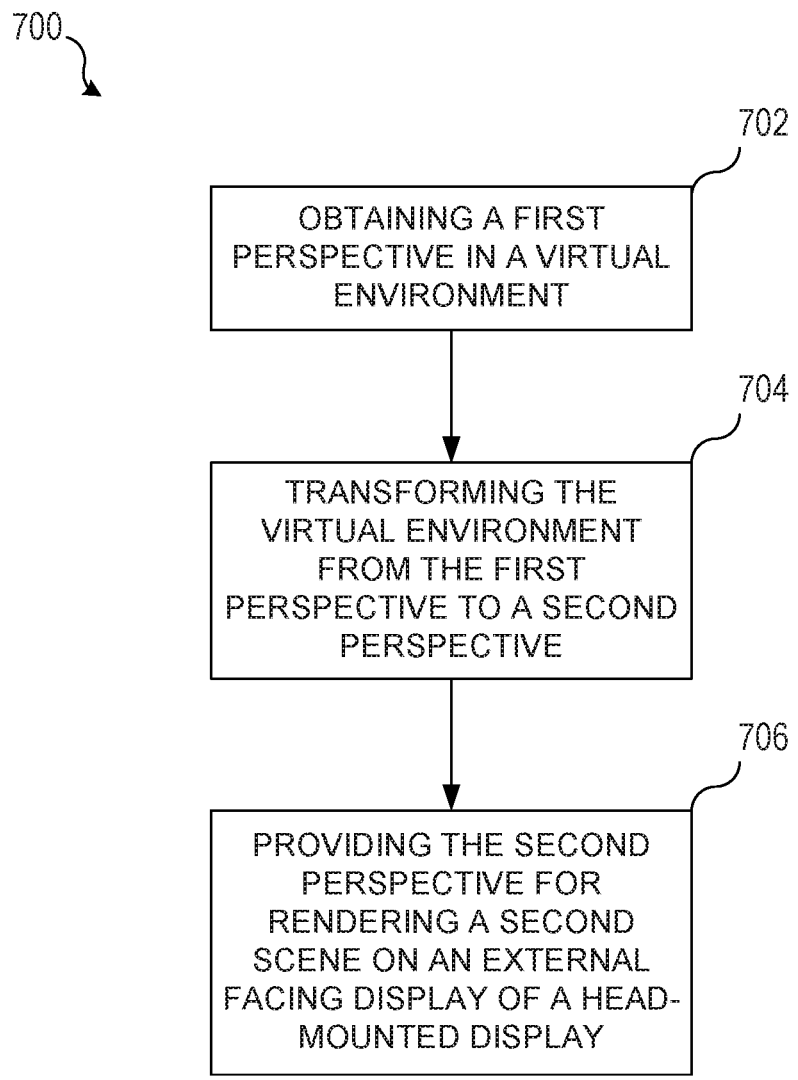
FIG. 7 is a block diagram of an exemplary technique for providing a second perspective to an external facing display, according to an embodiment.

FIG. 7 is a block diagram of an exemplary technique 700 for providing a second perspective (e.g., second perspective 115) to the external facing display (e.g., external facing display 106 or secondary external facing display 602) such as the system previously described in the examples herein and shown for instance in FIGS. 1-6. In describing the method 700, reference is made to one or more components, features, functions, and processes previously described herein. Where convenient, reference is made to the components, features, processes and the like with reference numerals. Reference numerals provided are exemplary and are nonexclusive. For instance, features, components, functions, processes, and the like described in the method 700 include, but are not limited to, the corresponding numbered elements provided herein. Other corresponding features described herein (both numbered and unnumbered) as well as their equivalents are also considered.

At 702, a first perspective, such as first perspective 114 in a virtual environment, may be obtained. For instance, the first transceiver 116 may obtain a first perspective 114 by receiving a communication or requesting the first perspective 114 from, for example, the external facing display 106, mobile device, 126, computer 128, cloud server, head-mounted display (e.g., head-mounted display 101 or 501), the calculator 118, second transceiver 120, chip, CPU, GPU, processor, ASIC, FPGA, display driver, controller, or other device. The first perspective 114 may be received by the first transceiver 116 by virtue of a bus, conductor, electrical connector, antenna 122A (such as a Wi-Fi, Bluetooth, cellular, or other antenna), or other communicative coupling.

In an example, the first perspective may be used to render a first scene on a user facing display 104 of a head-mounted display (e.g., head-mounted display 101 or 501). For instance, the first scene may be rendered based on the virtual environment (three-dimensional model) and the first perspective 114. The first transceiver 116 may transmit the first perspective 114, and optionally the three-dimensional model, to a rendering pipeline to generate the first scene for presentation on the user facing display 104 or the external facing display 106.

At 704, the virtual environment may be transformed from the first perspective to a second perspective, such as second perspective 115. In an example, a command may be received to transform the virtual environment from the first perspective to the second perspective. For instance, in an example, the command may be received from a mobile device (e.g., mobile device 502). In another example, the second perspective may be based on the position of an external facing display, such as the position of the external facing display 106 relative to the user facing display 104. In a further example, transforming virtual environment from to the second perspective may include scaling the scene (e.g., first scene 304A or 304B) or the virtual environment from the first perspective.

In an example, a message may be received from a gesture sensor, such as sensor 504. The message may include a parameter for transforming the virtual environment from the first perspective to the second perspective. In an example, transforming the virtual environment to the second perspective may include matching the virtual environment from the second perspective to the virtual environment of the first perspective. In other words, the transform may be a zero transformation where the second perspective is the first perspective (e.g., the second scene matches the first scene). In another example, transforming the virtual environment may include transforming to the virtual environment to the second perspective including an elevated viewpoint in the virtual environment. In a further example, the message may be received from a position sensor, such as position sensor 506. The position sensor may determine a position of the head-mounted display from positional data included in the message. The position sensor may provide the position to the calculator, such as calculator 118, as a parameter for transforming the virtual environment from the first perspective to the second perspective. In an example, the positional data may be based on detecting a fiducial marker (e.g., fiducial marker 510) presented on the external facing display. In a further example, depth information may be received from a depth sensor, such as sensor 504. The depth sensor may detect an object based on the depth information. The depth sensor may provide an object identification to the calculator as a parameter to transform the virtual environment.

At 706, the second perspective may be provided to render the second scene on an external facing display of the head-mounted display. In an example, the first perspective or the second perspective may be provided wirelessly. For instance, the second transceiver 120 or the first transceiver 116 may provide the first perspective to the user facing display over a wireless connection. In a further example, the second transceiver may provide the second perspective to the external facing display over a wireless connection. In another example, the second perspective may be provided to the external facing display attached to the head-mounted display.

In an example, the virtual environment from the first perspective or the second perspective may be rendered for presentation on the user facing display or the external facing display. For instance, the first scene may be rendered on the user facing display. The second scene may be rendered on the external facing display. The second scene may be rendered on the external facing display based on the second perspective. In a further example, the virtual environment may be transformed to the third perspective. The third perspective may be provided to the secondary external facing display for rendering the third scene.

Figure 8:
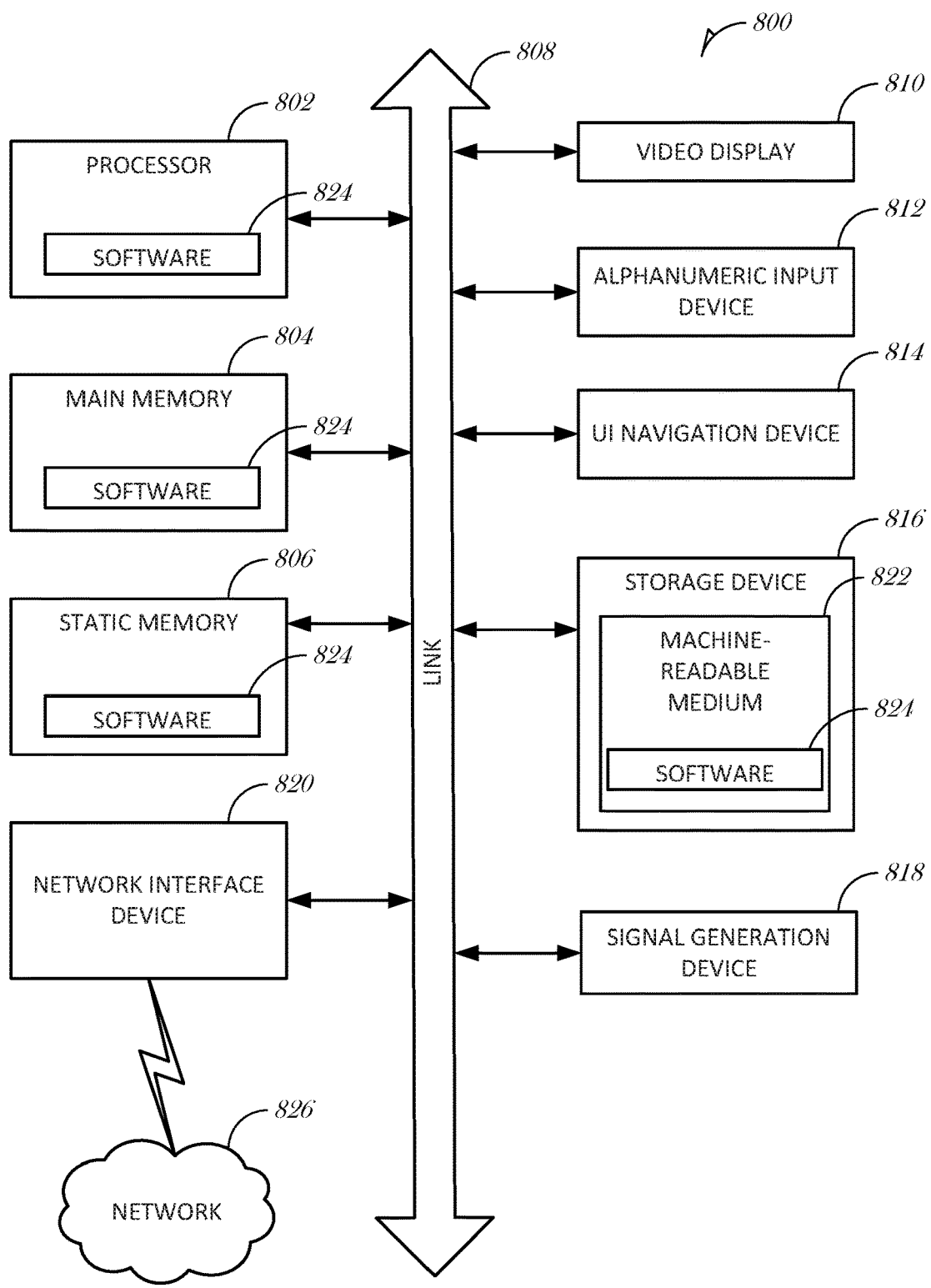
FIG. 8 is a block diagram illustrating an example machine upon which any one or more of the techniques discussed herein may perform, according to an example embodiment.

FIG. 8 is a block diagram illustrating an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer, or computer system) 800 may include a hardware processor 802 (e.g., a CPU, GPU, a hardware processor core, or any combination thereof), a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The mass storage device 826 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage device 816 may constitute machine readable media.

While the machine readable medium 822 is illustrated as a single medium, the term "machine readable medium" may include a single medium or multiple media (e.g., a centralized or distributed database, and/or associated caches and servers) that arranged to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples. To better illustrate the method and apparatuses disclosed herein, a non-limiting list of embodiments is provided here:

Example 1 is a system for a multiple screen head-mounted display, the system comprising: a first transceiver to obtain a first perspective of a virtual environment, the first perspective used to render a first scene on a user facing display of a head-mounted display; a calculator to transform the virtual environment from the first perspective to a second perspective; and a second transceiver to provide the second perspective of the virtual environment, the second perspective used to render a second scene on an external facing display of the head-mounted display.

In Example 2, the subject matter of Example 1 optionally includes wherein the first transceiver is wireless.

In Example 3, the subject matter of any one or more of Examples 1-2 optionally include wherein the head-mounted display includes the user facing display.

In Example 4, the subject matter of any one or more of Examples 1-3 optionally include wherein the head-mounted display includes the external facing display.

In Example 5, the subject matter of any one or more of Examples 1-4 optionally include wherein the external display is removably attached to the head-mounted display.

In Example 6, the subject matter of any one or more of Examples 1-5 optionally include wherein the first transceiver is to receive a command from a mobile device to transform the virtual environment from the first perspective to the second perspective.

In Example 7, the subject matter of any one or more of Examples 1-6 optionally include a gesture sensor to provide a parameter for the transform to the calculator.

In Example 8, the subject matter of any one or more of Examples 1-7 optionally include a position sensor to provide positional data to the calculator for the transform.

In Example 9, the subject matter of Example 8 optionally includes a fiducial marker presented on the external facing display, wherein the positional data is based on the position sensor detecting a position of the fiducial marker with respect to the position sensor.

In Example 10, the subject matter of any one or more of Examples 1-9 optionally include wherein the second perspective is an elevated viewpoint in the virtual environment.

In Example 11, the subject matter of any one or more of Examples 1-10 optionally include wherein the second perspective is based on a position of the external facing display relative to the user facing display.

In Example 12, the subject matter of any one or more of Examples 1-11 optionally include wherein the second transceiver is a wireless transceiver.

In Example 13, the subject matter of any one or more of Examples 1-12 optionally include a depth sensor to: receive depth information; detect an object based on the depth information; and provide an object identification to the calculator as a parameter to the transform.

In Example 14, the subject matter of any one or more of Examples 1-13 optionally include wherein the transform includes scaling the virtual environment.

In Example 15, the subject matter of any one or more of Examples 1-14 optionally include wherein the external facing display is monoscopic and the user facing display is stereoscopic.

In Example 16, the subject matter of any one or more of Examples 1-15 optionally include wherein the calculator is to apply distortion correction to the first scene to present on the user facing display.

In Example 17, the subject matter of any one or more of Examples 1-16 optionally include wherein the head-mounted display includes the first transceiver.

In Example 18, the subject matter of any one or more of Examples 1-17 optionally include a housing to support the user facing display and the external facing display.

In Example 19, the subject matter of any one or more of Examples 1-18 optionally include a secondary external facing display of the head-mounted display, wherein the calculator is to transform the virtual environment from a first perspective to a third perspective.

In Example 20, the subject matter of any one or more of Examples 1-19 optionally include wherein the second transceiver is to provide the second perspective used to render the scene on a three-dimensional wrap-around external facing display of the head-mounted display.

Example 21 is a method of providing a second perspective of a virtual environment to render a second scene on an external facing display of a head-mounted display, the method comprising: obtaining a first perspective in a virtual environment, the first perspective used to render a first scene on a user facing display of a head-mounted display; transforming the virtual environment from the first perspective to a second perspective; and providing the second perspective to render a second scene on an external facing display of the head-mounted display.

In Example 22, the subject matter of Example 21 optionally includes providing the first perspective to the user facing display wirelessly.

In Example 23, the subject matter of Example 22 optionally includes rendering the first perspective on the user facing display.

In Example 24, the subject matter of any one or more of Examples 21-23 optionally include rendering the second scene on the external facing display using the second perspective.

In Example 25, the subject matter of any one or more of Examples 21-24 optionally include wherein providing the second perspective includes providing the second perspective to the external display attached to the head-mounted display.

In Example 26, the subject matter of any one or more of Examples 21-25 optionally include receiving a command to transform the virtual environment from the first perspective to the second perspective.

In Example 27, the subject matter of Example 26 optionally includes wherein receiving the command includes receiving the command from a mobile device.

In Example 28, the subject matter of any one or more of Examples 21-27 optionally include receiving a parameter from a gesture sensor, the parameter for transforming the virtual environment to the second perspective.

In Example 29, the subject matter of any one or more of Examples 21-28 optionally include receiving a message from a position sensor; and determining a position of the head-mounted display from positional data included in the message; and providing the position to the calculator as a parameter to transforming the virtual environment.

In Example 30, the subject matter of Example 29 optionally includes wherein the positional data is based on detecting a fiducial marker presented on the external facing display.

In Example 31, the subject matter of any one or more of Examples 21-30 optionally include wherein transforming the virtual environment from the first perspective to the second perspective includes matching the second perspective to the first perspective.

In Example 32, the subject matter of any one or more of Examples 21-31 optionally include wherein transforming the virtual environment includes the second perspective having an elevated viewpoint of the virtual environment.

In Example 33, the subject matter of any one or more of Examples 21-32 optionally include wherein the second perspective is based on the position of the external facing display relative to the user facing display.

In Example 34, the subject matter of any one or more of Examples 21-33 optionally include wherein providing the second perspective includes providing the second perspective wirelessly.

In Example 35, the subject matter of any one or more of Examples 21-34 optionally include receiving depth information from a depth sensor; detecting an object based on the depth information; and providing an object identification to the calculator as a parameter to transforming the virtual environment.

In Example 36, the subject matter of any one or more of Examples 21-35 optionally include wherein transforming the virtual environment includes scaling the virtual environment to present the second scene.

In Example 37, the subject matter of any one or more of Examples 21-36 optionally include transforming the virtual environment from the first perspective to a third perspective and providing the third perspective to render on a secondary external facing display of the head-mounted display.

In Example 38, the subject matter of any one or more of Examples 21-37 optionally include wherein providing the second perspective includes providing the second perspective to a three-dimensional wrap-around external facing display of the head-mounted display.

Example 39 is at least one machine-readable medium including instructions, which when executed by a machine, cause the machine to perform operations of any of the methods of Examples 21-38.

Example 40 is an apparatus comprising means for performing any of the methods of Examples 21-38.

Example 41 is an apparatus comprising: a means for obtaining a first perspective in a virtual environment, the first perspective used to render a first scene on a user facing display of a head-mounted display; a means for transforming the virtual environment from the first perspective to a second perspective; and a means for providing the second perspective to render a second scene on an external facing display of the head-mounted display.

In Example 42, the subject matter of Example 41 optionally includes a means for providing the first perspective to the user facing display wirelessly.

In Example 43, the subject matter of any one or more of Examples 41-42 optionally include a means for rendering the first scene on the user facing display using the first perspective.

In Example 44, the subject matter of any one or more of Examples 41-43 optionally include a means for rendering the second scene on the external facing display using the second perspective.

In Example 45, the subject matter of any one or more of Examples 41-44 optionally include wherein the means for providing the second perspective includes means for providing the second perspective to the external display attached to the head-mounted display.

In Example 46, the subject matter of any one or more of Examples 41-45 optionally include a means for receiving a command to transform virtual environment from the first perspective to the second perspective.

In Example 47, the subject matter of Example 46 optionally includes wherein the means for receiving the command includes means for receiving the command from a mobile device.

In Example 48, the subject matter of any one or more of Examples 41-47 optionally include a means for receiving a parameter from a gesture sensor, the parameter to transform the virtual environment.

In Example 49, the subject matter of any one or more of Examples 41-48 optionally include a means for receiving a message from a position sensor; and a means for determining a position of the head-mounted display from positional data included in the message; and a means for providing the position to the calculator as a parameter to transform the virtual environment.

In Example 50, the subject matter of Example 49 optionally includes wherein the positional data is based on detecting a fiducial marker presented on the external facing display.

In Example 51, the subject matter of any one or more of Examples 41-50 optionally include wherein the means for transforming the virtual environment includes means for transforming the virtual environment to the second perspective to match the virtual environment from the first perspective.

In Example 52, the subject matter of any one or more of Examples 41-51 optionally include wherein the means for transforming the virtual environment includes means for transforming to the virtual environment to the second perspective having an elevated viewpoint of the virtual environment.

In Example 53, the subject matter of any one or more of Examples 41-52 optionally include wherein the second perspective is based on the position of the external facing display relative to the user facing display.

In Example 54, the subject matter of any one or more of Examples 41-53 optionally include wherein providing the second perspective includes providing the second perspective wirelessly.

In Example 55, the subject matter of any one or more of Examples 41-54 optionally include a means for receiving depth information from a depth sensor; a means for detecting an object based on the depth information; and a means for providing an object identification to the calculator as a parameter to transforming the virtual environment.

In Example 56, the subject matter of any one or more of Examples 41-55 optionally include wherein the means for transforming the virtual environment includes scaling the virtual environment to present the second scene.

In Example 57, the subject matter of any one or more of Examples 41-56 optionally include a means for transforming the virtual environment from the first perspective to a third perspective and means for providing the third perspective to render the virtual environment from the third perspective on a secondary external facing display of the head-mounted display.

In Example 58, the subject matter of any one or more of Examples 41-57 optionally include wherein the means for providing the second perspective includes means for providing the second perspective to a three-dimensional wraparound external facing display of the head-mounted display.

Example 59 is a machine-readable medium including instructions, for providing a second perspective of a virtual environment to render a second scene on an external facing display of a head-mounted display, which when executed by a machine, cause the machine to: obtain a first perspective in a virtual environment, the first perspective used to render a first scene on a user facing display of a head-mounted display; transform the virtual environment from the first perspective to a second perspective; and provide the second perspective to render a second scene on an external facing display of the head-mounted display.

In Example 60, the subject matter of Example 59 optionally includes rendering the second scene on the external facing display using the second perspective.

In Example 61, the subject matter of any one or more of Examples 59-60 optionally include receiving a command to transform the virtual environment from the first perspective to the second perspective.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A system for a multiple screen head-mounted display, the system comprising:
    a first transceiver to obtain a first perspective of a virtual environment, the first perspective used to render a first scene on a user facing display of a head-mounted display;
    a calculator to transform the virtual environment from the first perspective to a second perspective; and
    a second transceiver to provide the second perspective of the virtual environment, the second perspective used to render a second scene on an external facing display of the head-mourned display.

2. The system of claim 1, wherein the head-mounted display includes the external facing display.

3. The system of claim 1, wherein the external facing display is removably attached to the head-mounted display.

4. The system of claim 1, wherein the first transceiver is to receive a command from a mobile device to transform the virtual environment from the first perspective to the second perspective.

5. The system of claim 1, further comprising a gesture sensor to provide a parameter to the calculator for use by the calculator to transform the virtual environment from the first perspective to the second perspective.

6. The system of claim 1, further comprising a position sensor to provide positional data to the calculator for use by the calculator to transform the virtual environment from the first perspective to the second perspective.

7. The system of claim 6, further comprising a fiducial marker presented on the external facing display, wherein the positional data is based on the position sensor detecting a position of the fiducial marker with respect to the position sensor.

8. The system of claim 1, wherein the second perspective is based on a position of the external facing display relative to the user facing display.

9. The system of claim 1, further comprising a depth sensor to:
    receive depth information;
    detect an object based on the depth information; and
    provide an object identification to the calculator as a parameter for use by the calculator to transform the virtual environment from the first perspective to the second perspective.

10. The system of claim 1, wherein the head-mounted display includes the transceiver.

11. The system of claim 1, further comprising a housing support the user facing display and the external facing display.

12. The system of claim 1, further comprising a secondary external facing display of the head-mounted display, wherein the calculator is to transform the virtual environment from a first perspective to a third perspective.

13. The system of claim 1, wherein the second transceiver is to provide the second perspective used to render the scene on a three-dimensional wrap-around external facing display of the head-mounted display.

14. A method of providing a second perspective of a virtual environment to render a second scene on an external facing display of a head-mounted display, the method comprising:
    obtaining a first perspective in a virtual environment, the first perspective used to render a first scene on a user facing display of a head-mounted display;
    transforming the virtual environment from the first perspective to a second perspective; and
    providing the second perspective to render a second scene on an external facing display of the head-mounted display.

15. The method of claim 14, wherein providing the second perspective includes providing the second perspective to the external facing display attached to the head-mounted display.

16. The method of claim 14, further comprising receiving a command from a mobile device to transform the virtual environment from the first perspective to the second perspective.

17. The method of claim 14, further comprising receiving a parameter from a gesture sensor, the parameter for transforming the virtual environment to the second perspective.

18. The method of claim 14, further comprising:
    receiving a message from a position sensor; and
    determining a position of the head-mounted display from positional data included in the message; and
    providing the position to the calculator as a parameter to transforming the virtual environment.

19. The method of claim 18, wherein the positional data is based on detecting a fiducial marker presented on the external facing display.

20. The method of claim 14, wherein transforming the virtual environment from the first perspective to the second perspective includes matching the second perspective to the first perspective.

21. The method of claim 14, further comprising:
    receiving depth information from a depth sensor;
    detecting an object based on the depth information; and
    providing an object identification to the calculator as a parameter to transforming the virtual environment.

22. The method of claim 14, further comprising transforming the virtual environment from the first perspective to a third perspective and providing the third perspective to render on a secondary external facing display of the head-mounted display.

23. A non-transitory machine-readable medium including instructions, for providing a second perspective of a virtual environment to render a second scene on an external facing display of a head-mounted display, which when executed by a machine, cause the machine to:
- obtain a first perspective in a virtual environment, the first perspective used to render a first scene on a user facing display of a head-mounted display;
- transform the virtual environment from the first perspective to a second perspective; and
- provide the second perspective to render a second scene on an external facing display of the head-mounted display.

24. The non-transitory machine-readable medium of claim 23, further comprising rendering the second scene on the external facing display using the second perspective.

25. The non-transitory machine-readable medium of claim 23, further comprising receiving a command from a mobile device to transform the virtual environment from the first perspective to the second perspective.

* * * * *

UNITED STATES PATENT AND TRADEMARK OFFICE
CERTIFICATE OF CORRECTION

PATENT NO. : 10,095,461 B2
APPLICATION NO. : 15/274416
DATED : October 9, 2018
INVENTOR(S) : Daniel Pohl Page 1 of 1

It is certified that error appears in the above-identified patent and that said Letters Patent is hereby corrected as shown below:

In the Claims

In Column 17, Line 39, in Claim 1, delete "head-mourned" and insert --head-mounted-- therefor In Column 18, Line 6, in Claim 10, after "the", insert --first--

In Column 18, Line 7, in Claim 11, after "housing", insert --to--

Signed and Sealed this
Fourteenth Day of April, 2020

Andrei Iancu
*Director of the United States Patent and Trademark Office*